July 22, 1930.  F. W. GREER  1,771,117
CONFECTION STRINGING OR DECORATING MACHINE
Filed June 27, 1929   3 Sheets-Sheet 1
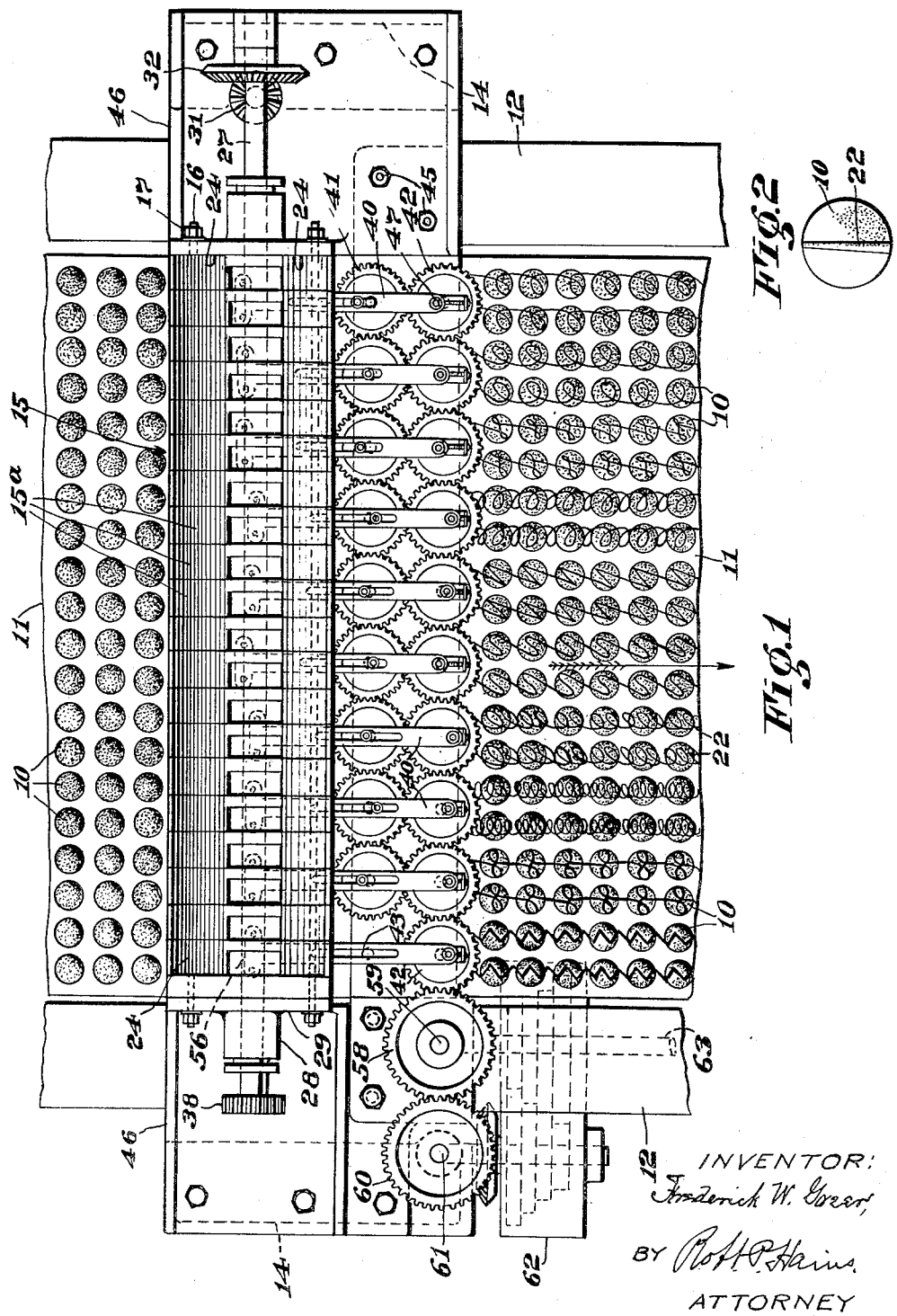
INVENTOR:
Frederick W. Greer,
BY
ATTORNEY

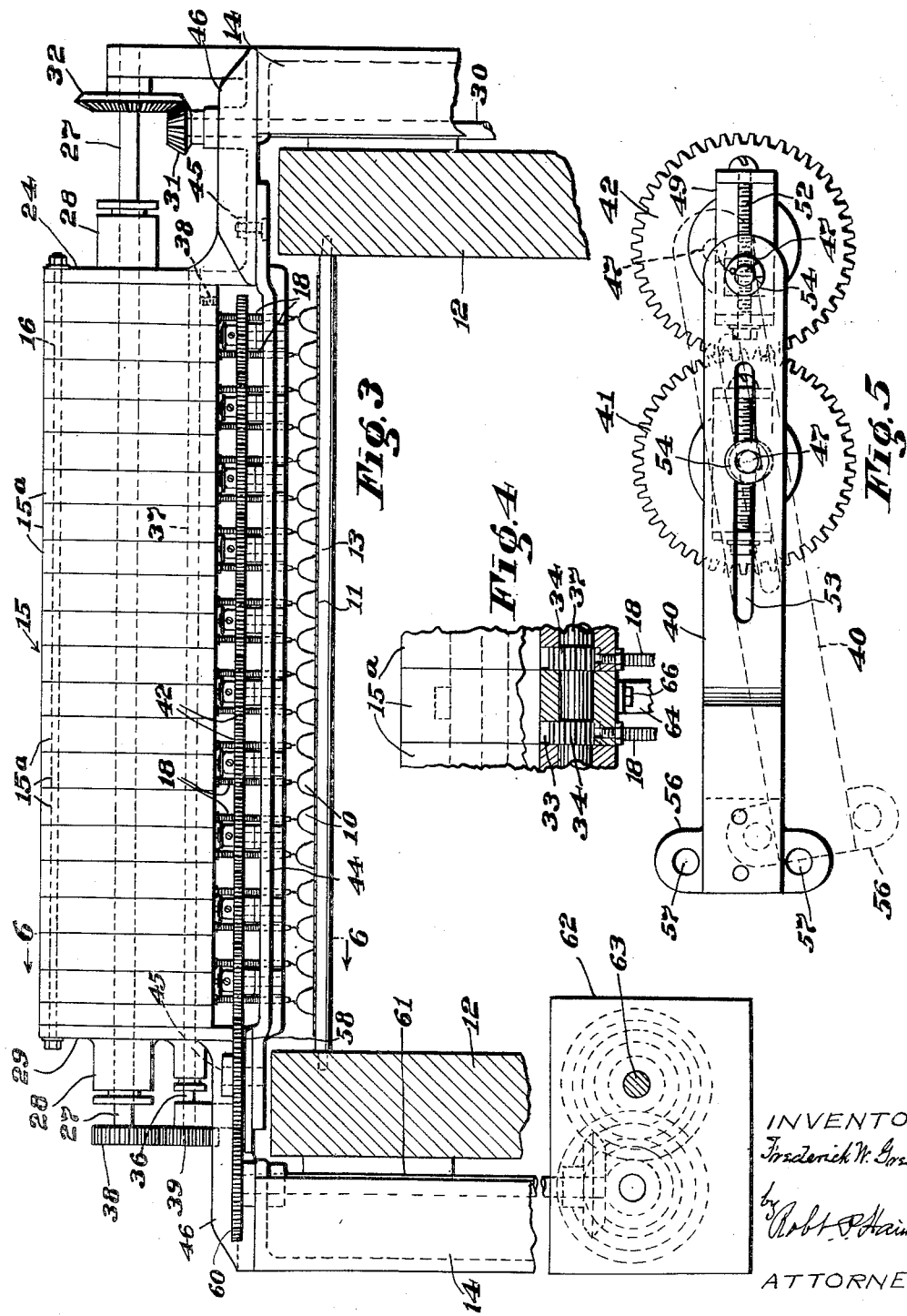

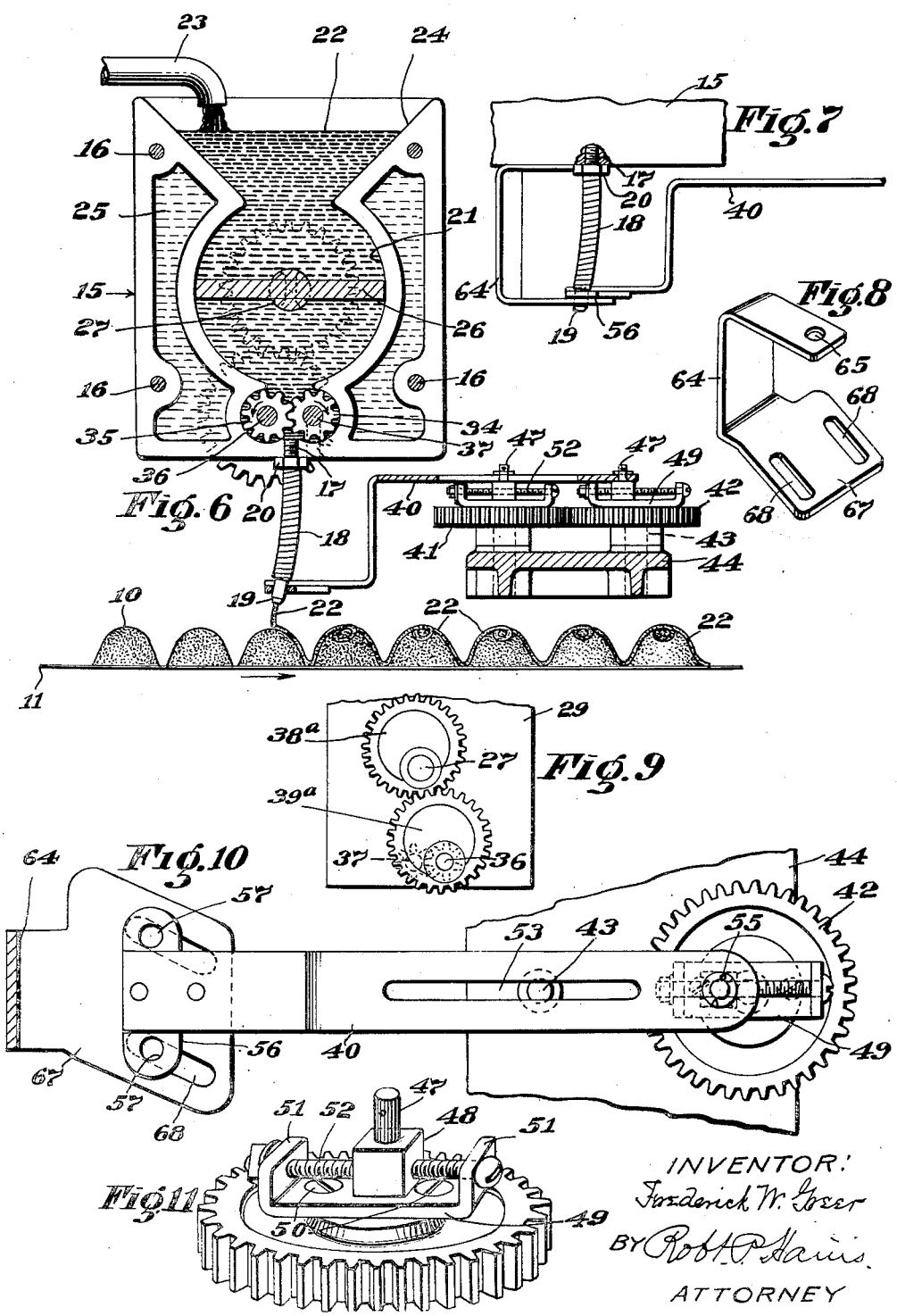

Patented July 22, 1930

1,771,117

UNITED STATES PATENT OFFICE

FREDERICK W. GREER, OF CAMBRIDGE, MASSACHUSETTS

CONFECTION STRINGING OR DECORATING MACHINE

Application filed June 27, 1929. Serial No. 374,087.

This invention relates to machines for depositing plastic material upon confections to form ornamental strings, ridges or designs thereupon.

Manufacturers of candy, fancy cakes and other confections find that there is a large demand for ornamental confections, such as coated candy and cakes having a string or ridge of chocolate placed upon the upper face of the confections to form an ornamental design.

In high grade work these decorating strings or ridges are placed upon the confections by hand, and as a result the configuration and appearance of the strings will vary extensively, thus giving each piece of candy a distinctive appearance. Hand stringing or decorating, however, is expensive, due to the skilled labor involved, and various machines have been proposed heretofore for stringing or decorating confections.

While these proposed stringing or decorating machines work more or less satisfactorily they are open to the objection that they apply the same shaped strings to the entire lot of confection being decorated, thus giving the confections a uniform appearance which shows they have been mechanically ornamented instead of ornamented by hand.

To overcome this difficulty it has been customary heretofore to ornament one lot of confection with one type strings and then change the adjustment of the machine to produce a different shaped string upon the next lot of confection. In this way several lots of differently decorated confections are produced and in packing the confection in boxes ready for the market a few pieces of confections are taken from each differently ornamented lot.

This course of procedure, however, is open to the objection that the machines have to be stopped at intervals to change the design of the confections, and the differently ornamented lots have to be handled separately.

The present invention seeks to overcome the above objections and relates to a confection stringing or decorating machine which is capable of applying differently shaped strings or ornaments simultaneously to the different rows of confections advanced through the machine so that the confections issuing from the machine will be variously ornamented, and in this respect will resemble the hand ornamented goods.

One important feature of the present invention resides in a stringing machine provided with a receptacle having a number of independently movable nipples connected to the receptacle for depositing chocolate or other stringing material upon the rows of confections advanced through the machine, and in means for imparting non-similar movements to the different nipples to vary the appearance of the strings formed upon the confections.

Another feature of the invention resides in a series of independently operable actuators for imparting various movements to the nipples, and in means whereby the movements imparted to each actuator may be readily varied throughout a large range.

A more specific feature of the present invention resides in a series of nipple actuating arms each of which is placed under the control of a pair of gears or eccentrics provided with pivot pins adjustable upon the gears to vary their eccentricity, and arranged so that each pivot pin constitutes a fulcrum about which the arm is rocked by the other gear or eccentric. As a result of this construction the movements imparted to each arm may be varied extensively.

Another feature of the invention resides in means for reciprocating the nipples and in independently adjustable guides for directing the movement of the nipples along paths disposed at any desired inclination to the path along which the goods are advanced.

A further feature of the invention resides in a receptacle provided with a number of flexible discharge pipes leading from the receptacle and each having a nipple at its outer end for depositing a stream of material forming an ornamented string upon a row of confections.

Still a further feature of the invention resides in gear pumps associated with the discharge nipples for forcing the material through the nipples and in means for varying the speed of the pumps to vary the size of the strings discharged from the nipples or to impart a tapered configuration to these strings.

Other features of the invention and novel combination of parts in addition to the above will be hereinafter described in connection with the accompanying drawings, which illustrate one good practical form of the invention.

In the drawings:—

Fig. 1 is a top plan view of portion of a stringing machine constructed in accordance with the present invention;

Fig. 2 is a top plan view of a confection having a tapered ornamental string deposited thereupon;

Fig. 3 is a vertical sectional view through the machine of Fig. 1, looking towards the operating gears for the string forming mechanism;

Fig. 4 is a side elevation with parts in section of portion of the material supply receptacle;

Fig. 5 is a top plan view of an actuating arm to be described, and the cooperating gears for shifting this arm;

Fig. 6 on an enlarged scale is a vertical sectional view taken on the line 6—6 of Fig. 3;

Fig. 7 is a side elevation of one of the flexible discharge pipes leading from the supply receptacle, and of the operating means associated therewith;

Fig. 8 is a perspective view of a guide for a pair of string depositing nipples;

Fig. 9 is a face view of a pair of eccentric gears for driving the pumps;

Fig. 10 is a top plan view similar to Fig. 5, showing the cooperation of the nipple operating mechanism with the guide of Fig. 8; and Fig. 11 is a perspective view of one of the arm actuating gears to be described.

The candy, cakes or other confections 10 to be decorated by the depositing of strings thereupon, in accordance with the present invention, are advanced to the decorating mechanism by an endless belt or conveyor 11 which conveyor may be supported between the side frames 12 for advancement lengthwise of the frame in the direction shown by the arrow of Fig. 1 and the upper run of the conveyor 11 may be supported by a series of rollers 13, or may slide over a fixed surface, as found desirable. To the side frames 12 may be secured the uprights 14 adapted to support the mechanism to be described for depositing the ornamental strings or ridges upon the confections. The conveyor 11 may serve to convey the confections from an enrobing or coating machine or from other sources of supply, and the conveyor 11 may be driven by means not shown in timed relation with the mechanism of such enrobing machine.

In accordance with the present invention, the chocolate or other material which is to be deposited upon the confections to form the ornamental strings or ridges thereupon is contained in a receptacle 15 which extends transversely of the conveyor 11 and may be supported above this conveyor by the uprights 14. This receptacle is preferably formed of a number of relatively narrow sections 15ª the opposite faces of which are ground or otherwise finished, to render them smooth in order that they may be clamped tightly together to form the relatively long receptacle 15. White lead or other material adapted to prevent leakage between the adjacent sections 15ª may be applied to the opposite faces of such sections, whereupon these sections may be firmly bolted together by the through bolts 16 having the nuts 17 at their opposite ends.

It is contemplated that the material containing receptacle 15 will be formed of as many separate sections 15ª as there are rows of confections 10 to be ornamented, and each section 15ª is therefore provided at its bottom with a discharge aperture 17, and in accordance with the present invention each aperture 17 has extending downwardly therefrom a flexible pipe 18 at the lower end of which is provided a nipple 19. The flexible pipes 18 may be formed of flexible metal tubing or rubber, as deemed advisable, and at the upper end of each tube 18 is provided a hollow threaded nut 20 adapted to be screwed into the threaded apertures 17 to secure the flexible tube to the section 15ª as shown.

The receptacle 15 formed of the sections 15ª is provided with the cylindrical shaped chamber 21 adapted to contain the chocolate or other string forming material 22 which material may be supplied to the receptacle by the discharge pipe 23, and the upper portion of the receptacle is preferably provided with the inclined faces 24 which will serve to direct the coating material downwardly into the chamber 21. In most cases it will be necessary to maintain the coating material at a temperature above the normal atmosphere or room temperature, and this may be accomplished by constructing the receptacle so that the chamber 21 thereof will be surrounded by the water jackets 25 to which water at the desired temperature may be supplied.

In most cases it is desirable to constantly stir the material 22 within the receptacle 15 and this may be accomplished by providing the stirrer 26 within the chamber 21 and which is secured to the driving shaft 27 that extends lengthwise of this receptacle and the opposite ends of which are journaled in the stuffing boxes 28 which project outwardly from the end plates 29 of the composite receptacle 15. The shaft 27 may be driven from a source of power not shown by the upwardly extending shaft 30 which is provided at its upper end with a bevel pinion 31 that meshes with a bevel gear 32 which is secured to the shaft 27.

When it has been attempted heretofore to force chocolate or other coating or ornamenting material through a series of small apertures, difficulty has been experienced, due to the clogging of the apertures. This difficulty is entirely overcome, in accordance with the present invention, by providing each discharge aperture 17 with a pump for positively forcing the material through such apertures. A small gear pump is well adapted for this purpose, and, in accordance with the present invention, each section 15ª of the receptacle has a recess or pocket 33 formed in the lower portion thereof, adapted to receive a pair of cooperating gears 34 and 35, which constitute a gear pump for forcing the material 22 through the discharge aperture 17. One gear, for example, 35, of each pump may be rigidly secured to and driven by the power shaft 36, whereas the opposite gear 34 of each pump may be journaled upon the fixed shaft 37, which shaft may be held against rotation by a set screw 38 (see Fig. 3). The gear operating shaft 36 is conveniently driven from the stirrer actuating shaft 27 by providing a projecting end of the shaft 27 with a driving gear 38 which meshes with a gear 39 rigidly secured to the power shaft 36.

It is found that the size of the string 22 discharged from each nipple 19 may be easily regulated by simply varying the speed at which the gear pumps are driven, and it will be seen that the speed at which these pumps are driven can be easily varied as desired by changing the relative size of the cooperating gears 38 and 39. If a relatively large string 22 is desired, this may be produced by speeding up the gear pumps and if a smaller string is desired this is produced by reducing the speed of the gear pumps.

In some cases it is desirable to apply a tapered string to confections being ornamented so that the diameter of the string deposited upon a confection will vary from one end towards the other, as will be apparent from Fig. 2 of the drawing. This tapered string can be produced by merely varying the speed at which the gear pumps are operated, but it will be apparent that the speed of operation of such pumps must be rapidly varied in order to appreciably change the size of the string 22 as it is deposited upon a confection. This changing speed, however, is readily secured by providing the shafts 27 and 36 with the cooperating eccentric gears 38ª and 39ª, as shown in Fig. 9. It will be seen from the foregoing that various changes in the size and shape of the string 22 may be produced in accordance with the present invention by simply changing the speed at which the gear pumps are driven.

As above stated, an important feature of the present invention resides in the construction whereby dissimilar strings 22 may be deposited simultaneously upon adjacent rows of the confections 10, and this is readily accomplished, as will now be pointed out, by providing independently operating means for shifting the various nipples 19 so that while one nipple is being moved to form one type of ornamental string, an entirely different movement may be imparted to the next adjacent nipple. The desired movement is imparted to the nipples 19, in the embodiment of the invention shown, by providing the actuating arms 40 each of which is adapted to be actuated by a pair of cooperating gears 41 and 42, which, in the construction shown, rotate in a horizontal plane. These gears are journaled upon the stub shafts 43 which extend upwardly from the bridge bar 44 that extends transversely of the supporting frame described, and the ends of the bridge bar 44 may be secured by bolts 45 to the castings 46 which may be integral with and extend laterally from the upwardly extending end plates 29 above mentioned.

The arrangement is such that the bridge bar 44 and material supply receptacle are supported above the conveyor 11 by the uprights 14, as shown. Each of the gears 41 and 42 constitute an eccentric for actuating the arm 40, and this is accomplished by providing each of these gears with an upwardly extending stub shaft 47 which is preferably adjustably secured to its gear for movement towards and from the axis of the gear to thereby vary the eccentricity of the shaft 47 with respect to its operating gear.

This desired adjustment is secured, in the construction shown, by providing each stub shaft 47 with an enlarged block 48 at its lower end, the lower face of which is adapted to rest upon a plate 49 which may be secured to the gears 41 and 42 by the screws 50, and this plate 49 is provided with the upwardly extending ends 51 in which the end portions of an adjusting screw 52 are journaled. The construction is such that the intermediate portion of this screw has threaded engagement with the block 48 and rotation of the screw 52 will serve to adjust the block 48 radially of its supporting gears to vary the eccentricity of the stub shaft 47.

The actuating arm 40 is provided adjacent one end thereof with a circular hole adapted to rotatably receive the stub shaft 47 of the gear 42, and the intermediate portion of this arm 40 is provided with an elongated slot 53 adapted to slidably receive the stub shaft 47 of the gear 41, and the arm 48 may be retained in operative engagement with these stub shafts by providing each stub shaft with a washer 54 and cotter pin 55, as will be apparent from Fig. 5.

In the construction shown, each actuating arm 40 is adapted to control the movement of two nipples 19; it will be apparent, however, that the number of nipples controlled by a single arm 40 may be varied as desired. In the construction shown one end of the arm 40 has rigidly secured thereto a transversely extending bar 56 having near its opposite ends the nipple receiving openings 57, the arrangement being such that each nipple may partake of a slight rocking movement within its opening 57, as will be apparent from Fig. 6. It will be apparent from the construction just described that each stub shaft 47 constitutes a fulcrum about which the arm 40 is rocked by the eccentric movement of the other stub shaft 47 so that various compound movements may be imparted to each actuating arm 40 by adjusting the stub shafts 47 eccentrically of their operating gears and rotating these gears.

The combination of movements which may be imparted to the nipples 19 by the mechanism just described is practically unlimited, since the movement imparted to an arm 40 may be varied not only by adjusting either stub shaft 47 with respect to its operating gear, but said movement may be further varied by removing one of the gears 41 or 42 from its stub shaft 43 and turning the same through part of a complete revolution and then returning it to its operating position to thereby change the angular position of one stub shaft 47 with respect to the other stub shaft 47.

It will be seen from the foregoing, and from the construction best shown in Fig. 1, that an actuating arm 40 is provided for each pair of nipples 19, and it will also be seen that the various operating gears 41 and 42 mesh with the gears for operating the next adjacent arm 40. In the construction shown, this entire series of gears is driven by an idle gear 58 journaled upon the fixed shaft 59 and the gear 58 is in turn driven by the gear 60 which is rigidly secured to the upwardly extending shaft 61. It is desirable that the actuating arms 40 and driving gears therefor be driven at comparatively high speed; for example, the operating gears 41 and 42 may be driven from say 100 to 400 revolutions per minute. It is desirable to vary the speed of operation of these gears and the actuating arms 40 throughout a relatively wide range, to thereby vary the configuration of the ornamental strings 22 deposited upon the confections 10.

It will be apparent that if the confections are advanced under the nipples 19 at a predetermined speed, and these nipples are shifted back and forth laterally with respect to the rows of confections, the appearance of the string deposited upon each confection will vary decidedly with the speed at which the nipples are shifted transversely of the traveling confections. The speed at which the gears 41 and 42 are driven may be varied as desired by providing a change gear box 62 of well known construction for varying the speed at which the vertical shaft 61 may be operated from the main driving shaft 63.

The operating mechanism so far described for imparting compound movements to the actuating arms 40 will in most cases move the nipples in curved paths, but in some cases it may be desirable to reciprocate the nipples along straight paths disposed diagonally of the rows of confections being decorated. This is readily accomplished by removing the gear 41 associated with each actuating arm 40, as shown in Fig. 10, so that a reciprocatory movement will be imparted to each arm 40 by the remaining gear 42, and while this reciprocatory movement is being imparted to the nipples, they may be guided along a path disposed at any desired inclination to the row of confections by providing each pair of nipples 19 with the guiding bracket 64, the construction of which is best shown in Fig. 8.

The upper end of the bracket 64 is provided with a bolt hole 65 adapted to receive a bolt 66 for rigidly securing this bracket to the lower face of a section 15, as will be apparent from Fig. 4. The bracket 64 is somewhat U-shaped in configuration and at the lower end thereof is formed the plate 67 of increased width, and in which is provided the elongated slots 68 adapted to receive the nipples 19, as will be apparent from Fig. 7. By employing the guide 64 just described, the movement of the nipples will be restricted to a straight line path which, as above suggested, may be disposed at any inclination to the direction in which the confections are being advanced.

It will be apparent from the foregoing that the nipple actuating means herein described is capable of imparting an almost unlimited number of different movements to the nipples to deposit practically any conceivable form of ornamental string upon a row of confections. It will also be seen that every pair of nipples is actuated by an independently movable arm 40 so that each pair of rows of confections delivered by the conveyor 11 will be similarly decorated, whereas, all the other pairs of rows of confections may be provided with an entirely different form of ornamental string. This will be apparent from Fig. 1, wherein it will be seen that the actuating arm 40 adjacent the left-hand side of the machine is controlled by a single gear and by the guide 64, whereas the various other arms 40 are controlled by a pair of gears, but the movement imparted to each of these arms 40 will be different, because of the different adjustment of the stub shafts 47 with respect to their actuating gears, and as a result each pair of rows of confections will be differently decorated, as will be apparent from Fig. 1.

It will be seen from the foregoing that the confectionery stringing or ornamenting machine of the present invention will serve to deposit dissimilar ornamentations simultaneously on any desired number of rows of confections, and it will also be seen that since a gear pump is associated with each discharge aperture, the chocolate or other material 22 will be positively forced through the discharge pipe 18, thus avoiding any danger of the operating parts becoming clogged during the operation of the machine. Furthermore, since a force feed is associated with each nozzle, much thicker stringing material can be used than heretofore.

Should the coating material harden within the discharge pipes 18 when the machine is allowed to stand, it may be again softened by placing an electric heater or other form of heating device adjacent the various discharge pipes 18.

What is claimed is:—

1. A stringing or decorating machine, comprising in combination, a frame, a conveyor for advancing adjacent rows of confections lengthwise of the frame, a receptacle supported above said conveyor and provided with flexible discharge pipes leading therefrom and each having a nipple for depositing a decorating string upon the confections of a row, and means for imparting different independent movements to the different nipples to cause the row of confections passing under one nipple to be ornamented differently from the row passing under an adjacent nipple.

2. A stringing or decorating machine, comprising in combination, a frame, a conveyor for advancing rows of confections lengthwise of the frame, a receptacle supported above said conveyor and provided with flexible discharge pipes leading therefrom and each having a nipple for depositing a decorating string upon the confections of a row, and means for shifting the nipples simultaneously but along dissimilar paths to cause different ornamental strings to be deposited simultaneously on adjacent rows of confections.

3. A stringing or decorating machine comprising in combination, a frame, a conveyor for advancing rows of confections lengthwise of the frame, a receptacle supported adjacent said conveyor and provided with flexible discharge pipes leading therefrom and each having a nipple for depositing a decorating string upon the confections of a row, independently movable actuators for different nipples, and means for shifting the actuators simultaneously but in differently curved paths to cause the confections in adjacent rows to be ornamented differently.

4. A stringing or decorating machine, comprising in combination, a conveyor for advancing rows of articles to be decorated, a receptacle provided with flexible discharge pipes leading therefrom and provided with nipples for depositing decorating strings upon the articles, independently movable actuator for shifting the nipples, and means for imparting simultaneous but not similar movements to the actuators to cause the articles in adjacent rows to be ornamented differently.

5. A stringing or decorating machine, comprising in combination, a conveyor for advancing rows of articles to be decorated, a receptacle supported adjacent said conveyor and provided with discharge nipples connected to the receptacle for movement relative to the receptacle and to each other to deposit decorating strings upon the articles, independently movable actuators for shifting said nipples, and means for imparting simultaneous but non-similar movements to the actuators to cause the articles in adjacent rows to be ornamented differently.

6. A stringing or decorating machine, comprising in combination, a conveyor for advancing confections to be decorated, a receptacle supported in a fixed position adjacent the conveyor and provided with a discharge nipple connected to the receptacle for movement relative thereto to deposit a decorating string upon the confections, an actuating arm for shifting the nipple relative to the receptacle, and a pair of rotating eccentrics each having a pivot element constituting a fulcrum about which the arm is rocked by the other eccentric to impart various movements to the arm and nipple.

7. A stringing or decorating machine, comprising in combination, a conveyor for advancing confections to be decorated, a receptacle supported adjacent the conveyor and provided with a discharge nipple connected to the receptacle for movement relative thereto for depositing a decorating string upon the confections, an arm for shifting the nipple relative to the receptacle, and a pair of eccentrics each having a pivot element adjustable to vary its eccentricity and each constituting a fulcrum about which the arm is rocked by the other eccentric to impart to the arm and nipple various compound movements.

8. A stringing or decorating machine, comprising in combination, a conveyor for advancing confections to be decorated, a receptacle provided with a discharge nipple movably connected to the receptacle and positioned to deposit a stream forming a decorating string upon the confections, an arm for shifting the nipple relative to the receptacle, a pair of power driven gears for actuating said arm and provided with pivot elements adjustable upon the gears to vary their eccentricity and arranged so that each pivot element constitutes a fulcrum about which the arm is rocked by the other pivot element to impart to the arm and nipple various compound movements.

9. A stringing or decorating machine, comprising in combination, a conveyor for advancing confections to be decorated, a receptacle provided with a discharge nipple movably connected to the receptacle and positioned to deposit a decorating string upon the confections, an arm for shifting the nipple relative to the receptacle, a pair of power driven gears for actuating said arm and each provided with an eccentrically disposed pivot pin constituting a fulcrum about which the arm is rocked by the other pivot pin to impart to the arm and nipple various movements.

10. A stringing or decorating machine, comprising in combination, a conveyor for advancing confections to be decorated, a receptacle supported adjacent the conveyor and provided with a discharge nipple connected to the receptacle for movement relative thereto for depositing a decorating string upon the confections, a pair of power driven gears supported to rotate in a horizontal plane and adapted to be readily removable from their support to permit the rotation of one independently of the other for adjustment, an arm extending across said gears to be shifted thereby to impart different movements to the nipple, and eccentrically disposed pins upon the gears and each adapted to constitute a fulcrum about which the arm is rocked by the other pin to actuate the arm and nipple.

11. A stringing or decorating machine, comprising in combination a conveyor for advancing adjacent rows of confections to be decorated, a receptacle provided with small, independently movable discharge orifices positioned to deposit a stream forming a decorating string upon each row of confections, separate pumps associated with the orifices for forcing the material supplied by the receptacle through the orifices, means for rapidly varying the speed at which the pumps are operated to cause the size of the streams discharged from the orifices to vary sufficiently to give a tapered configuration to the string deposited upon a confection, and means for imparting simultaneous but non-similar movements to the orifices to further vary the appearance of the strings.

12. A stringing or decorating machine, comprising in combination, a conveyor for advancing adjacent rows of confections to be decorated, a receptacle provided with a series of discharge nipples movably connected to the receptacle and positioned to deposit a stream forming a decorating string upon each row of confections, power actuated means for reciprocating the nipples above the rows of confections, independently adjustable guides for guiding the reciprocating nipples diagonally of the rows of confections, and means for securing the guides in different positions of adjustment to vary the paths of the nipples.

13. A stringing or decorating machine, comprising in combination, a conveyor for advancing adjacent rows of confections to be decorated, a receptacle provided with a series of discharge nipples movably connected to the receptacle and positioned to deposit a stream forming a decorating string upon each row of confections, power actuated means for reciprocating the nipples above the rows of confections, angularly adjustable guides for guiding the reciprocating nipples diagonally of the rows of confections, and independently adjustable means for varying the length of strokes imparted to the nipples to cause adjacent nipples to be actuated differently.

14. A stringing or decorating machine, comprising in combination, a conveyor for advancing adjacent rows of confections to be decorated, a receptacle provided with a series of discharge nipples movably connected to the receptacle and positioned to deposit a stream forming a decorating string upon each row of confections, power actuated means for reciprocating the nipples above the rows of confections, independently adjustable guides for guiding the reciprocating nipples diagonally of the rows of confections, and adjustable means for varying the length of stroke imparted to the different nipples.

15. A stringing or decorating machine, comprising in combination, a conveyor for advancing rows of articles to be decorated, a receptacle supported adjacent said conveyor and provided with discharge nipples connected to the receptacle for movement relative to the receptacle and to each other to deposit decorating strings upon the articles, independently movable actuators for shifting said nipples, and means for imparting non-similar movements to said actuators including a train of gears adapted to drive one gear from the other and provided with eccentric elements for shifting the actuators.

In testimony whereof, I have signed my name to this specification.

FREDERICK W. GREER.